Oct. 9, 1962   K. SCHWARTZWALDER   3,057,941
HEAT-SENSING DEVICE WITH PROTECTIVE SHEATH
Filed May 17, 1961

INVENTOR.
Karl Schwartzwalder
BY
Paul J. Reising
ATTORNEY

3,057,941
Patented Oct. 9, 1962

3,057,941
HEAT-SENSING DEVICE WITH PROTECTIVE SHEATH
Karl Schwartzwalder, Holly, Mich., assignor to General Motors Corporation, Detroit, Mich., a corporation of Delaware
Filed May 17, 1961, Ser. No. 110,669
4 Claims. (Cl. 136—4)

This invention relates to a heat-sensing device and, more particularly, to a thermocouple of the type used in aircraft jet engines and the like to measure the temperature of the gases therein. It has as its principal object the provision of a heat-sensing device which has excellent durability due to its high resistance to the corrosive effects of the environment in which it operates and which provides very fast response to changes in temperature of the environment. More specifically, it is an object of the invention to provide a thermocouple having a bimetal heat-sensitive junction protected by a sheath of a material which has high heat and corrosion resistance and yet which does not significantly reduce the rate of heat transfer to the junction from the environment in which it operates.

Briefly, these objects are accomplished in accordance with the invention by a device of the character described wherein the heat-sensitive element is protected by a covering of a material selected from the group consisting of magnesium fluoride, strontium fluoride, calcium fluoride and barium fluoride, magnesium fluoride being much preferred. Such a covering can be accomplished either by hot pressing the material in pulverant form around the heat-sensitive element to form a protective block incasing the element or by coating the element with a thin layer of the material as, for example, by a vapor coating in a vacuum or by the use of a fluidized bed of the material. The aforementioned alkaline earth metal fluorides, and magnesium fluoride in particular, provide excellent heat and corrosion resistance and yet do not significantly increase the response time of the thermocouple, this presumably because of the high degree of transparency to infrared radiation.

Other objects and advantages of the invention will appear more clearly from the following detailed description of preferred embodiments thereof made with reference to the drawings in which.

Figure 1:
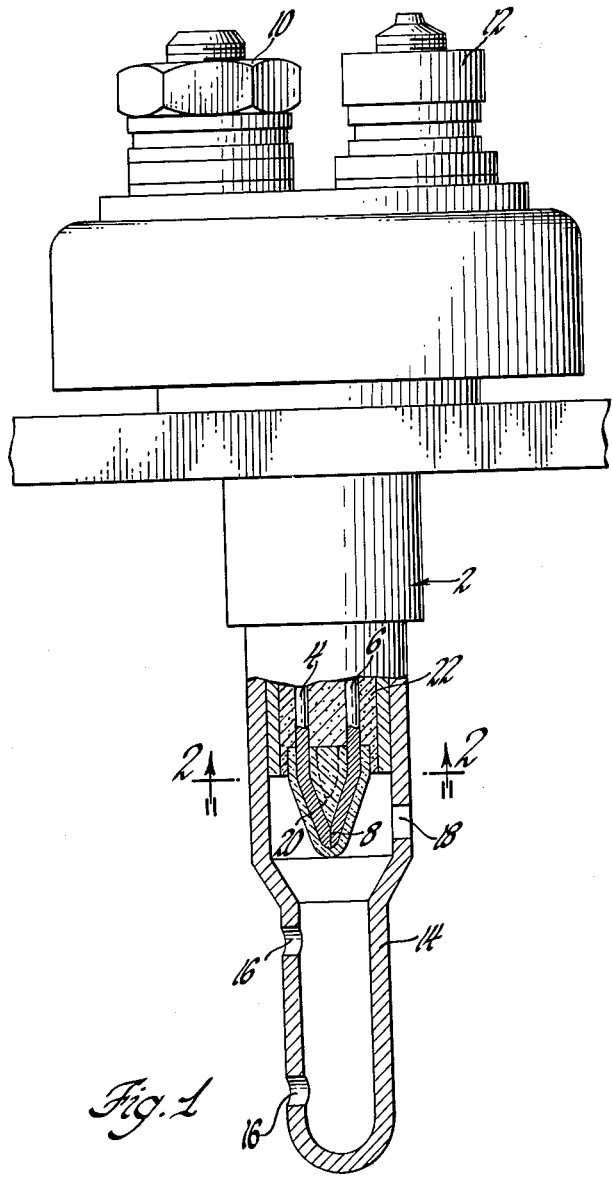
FIGURE 1 is a side view with parts broken away of a thermocouple embodying the invention, in this embodiment the protective sheath being in the form of a hot pressed block which incases the heat-sensitive junction of the thermocouple.

Referring now to FIGURE 1 the thermocouple shown comprises a suitable metal casing 2 which insulatively supports a pair of thermocouple wires 4 and 6 joined at their lower ends to form the heat-sensitive junction 8 and provided at their upper ends with contact terminals 10 and 12. The casing and the insulative support therein for the thermocouple wires can be of any suitable structure such, for example, as that shown in United States Patent 2,888,508, issued to Gustav F. Rademacher on May 26, 1959. Metals typically used for the thermocouple wires are Chromel and Alumel, though it will be understood that other combinations of metals which are well known in the art as providing a junction having an electrical resistivity which is temperature dependent may be used in the practice of the invention. It is desirable that the lower end of the casing be provided with a tubular portion 14 having gas inlet openings 16 and gas outlet openings 18 to cause the gases to be circulated around the heat-sensitive junction. While the embodiment shown incorporates only a single junction, it will be understood that two pairs of wires and two junctions may be used if desired, this as shown in the aforementioned patent.

Figure 2:
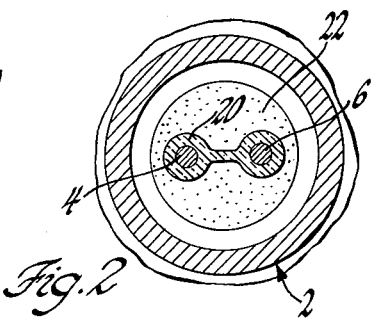
FIGURE 2 is a view taken on the line 2—2 of FIGURE 1 and shows a section of the thermocouple wires and sheath just above the heat-sensitive junction.

In accordance with the present invention, the heat-sensitive junction and the lower portions of the thermocouple wires are incased in a dense solid block 20 of magnesium fluoride. The shape of the block generally follows the shape of the wires and junction, that portion of the block between the wires being of thinner section than the portions immediately adjacent the wires and the junction, this as can best be seen by reference to FIGURE 2. Where, as in the embodiments shown, packed magnesium oxide powder or other ceramic is utilized as an insulative support for the thermocouple wires adjacent the junction, as can be seen at 22, it is desirable that the protective sheath extend at least for some distance into the ceramic to assure against any exposure of the wires.

The magnesium fluoride block 20 can be formed during manufacture of the thermocouple and prior to assembly thereof, by placing the lower end of the thermocouple wire subassembly in a suitable matched die block assembly and hot pressing powdered magnesium fluoride around the wires at about 1000° C. and about 500 to 5000 p.s.i. pressure. This hot pressing causes the powder to sinter thereby forming the solid nonporous block.

Figure 3:
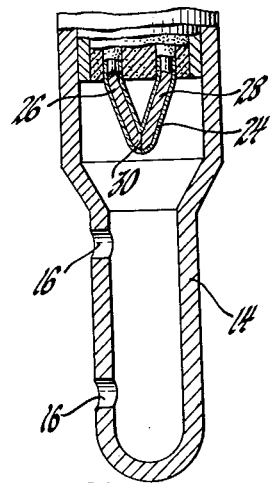
FIGURE 3 is a side view of the bottom portion only of another thermocouple embodying the invention, in this embodiment the protective sheath being in the form of a thin coating over the heat-sensitive junction.

In the embodiment shown in FIGURE 3, the protective sheath of magnesium fluoride is in the form of a thin continuous layer 24 covering the lower ends of the thermocouple wires 26 and 28 and the heat-sensitive junction 30. During manufacture the coating can be accomplished in any desired manner. For example, the wire subassembly can be supported in an evacuated chamber in which magnesium fluoride is heated to vaporization, the vapor condensing out on the wires and junction to thereby form the thin layer. Alternatively, the junction end of the thermocouple wire subassembly can be heated and then immersed in a fluidized bed of magnesium fluoride powder to thereby cause deposition of a thin layer on the wires and junction. By fluidized bed is meant a container of the finely pulverized material, the material being maintained suspended by a jet of air or other gas blown into the container, usually from the bottom thereof.

By reason of its high thermal conductivity and its transparency to infrared radiation, the thermocouple wire sheath causes extremely little increase in response time and yet, because of its desirable coefficient of expansion, good mechanical strength and thermal shock, heat and corrosion resistance, the protection afforded the wires and junction is excellent thereby greatly increasing the durability and useful life of the thermocouple.

It will be understood that while the invention has been described particularly with reference to preferred embodiments thereof, it is not so limited since changes and modifications may be made, all within the full and intended scope of the claims which follow.

I claim:
1. A thermocouple comprising a pair of dissimilar metal wires having their ends joined to form a heat-sensitive junction and a protective covering over said junction of a material selected from the group consisting of magnesium fluoride, strontium fluoride, calcium fluoride and barium fluoride.
2. A thermocouple comprising a pair of dissimilar metal wires having their ends joined to form a heat-sensitive junction and a protective covering over said junction of magnesium fluoride.

3. A thermocouple comprising a metal casing, a mass of heat-resistant insulating material in said casing, a pair of thermocouple wires extending through said insulating material and having their ends joined to form a heat-sensitive junction exterior of said insulating material, and a protective sheath extending from said insulating material over the ends of said thermocouple wires and said heat-sensitive junction, said protective sheath being formed of a material selected from the group consisting of magnesium fluoride, strontium fluoride, calcium fluoride and barium fluoride.

4. A thermocouple comprising a metal casing, a mass of heat-resistant insulating material in said casing, a pair of thermocouple wires extending through said insulating material and having their ends joined to form a heat-sensitive junction exterior of said insulating material, and a protective sheath extending from said insulating material over the ends of said thermocouple wires and said heat-sensitive junction, said protective sheath being formed of magnesium fluoride.

References Cited in the file of this patent

UNITED STATES PATENTS

| | | |
|---|---|---|
| 2,668,478 | Schroder | Feb. 9, 1954 |
| 2,742,756 | De Boisblanc | Apr. 24, 1956 |
| 2,870,233 | Comer | Jan. 20, 1959 |